United States Patent [19]

Yagi et al.

[11] Patent Number: 5,528,730
[45] Date of Patent: Jun. 18, 1996

[54] METHOD OF CONTROL RULE GENERATION AND METHOD OF FUZZY CONTROL USING THE SAME, AND APPARATUS FOR AUTOMATIC CONTROL RULE GENERATION AND FUZZY CONTROL APPARATUS USING THE SAME

[75] Inventors: Hiroyuki Yagi; Takahide Kawasaki; Takao Watanabe, all of Hitachi, Japan

[73] Assignee: Hitachi, Ltd., Tokyo, Japan

[21] Appl. No.: 591,892

[22] Filed: Oct. 2, 1990

[30] Foreign Application Priority Data

Oct. 6, 1989 [JP] Japan .................... 1-260296

[51] Int. Cl.$^6$ ............................... G06F 9/44
[52] U.S. Cl. ................................ 395/51; 395/61
[58] Field of Search ..................... 364/513; 382/14, 382/30; 15/319; 395/51, 61, 1, 900, 902, 903, 906

[56] References Cited

U.S. PATENT DOCUMENTS

| | | | |
|---|---|---|---|
| 3,846,752 | 11/1974 | Nakano et al. | 382/30 |
| 4,760,896 | 8/1988 | Yamaguchi | 187/124 |
| 4,777,585 | 10/1988 | Kokawa et al. | 395/903 |
| 4,803,636 | 2/1989 | Nishiyama et al. | 395/51 |
| 4,816,994 | 3/1989 | Freiling et al. | 395/75 |
| 4,930,084 | 5/1990 | Hosaka et al. | 364/426.04 |
| 4,931,951 | 6/1990 | Murai et al. | 395/51 |
| 4,958,406 | 9/1990 | Toyoshima et al. | 15/319 |
| 4,984,174 | 1/1990 | Yasunobu et al. | 395/906 |
| 4,984,773 | 1/1991 | Balban et al. | 364/513 |
| 5,014,327 | 5/1991 | Potter et al. | 382/14 |
| 5,065,440 | 11/1991 | Yoshida et al. | 382/30 |
| 5,084,813 | 1/1992 | Ono | 395/1 |
| 5,179,634 | 1/1993 | Matsunaga et al. | 395/51 |
| 5,375,448 | 12/1994 | Katayama et al. | 72/8 |

FOREIGN PATENT DOCUMENTS

| | | |
|---|---|---|
| 0421793A3 | 4/1993 | European Pat. Off. . |
| 60-237539 | 11/1985 | Japan . |
| 62-271146 | 11/1987 | Japan . |
| 62-288941 | 12/1987 | Japan . |
| 63-271534 | 11/1988 | Japan . |
| 0144546 | 2/1989 | Japan . |

Primary Examiner—George B. Davis
Attorney, Agent, or Firm—Antonelli, Terry, Stout & Kraus

[57] ABSTRACT

A method and apparatus for generating a control rule for controlling a control object which is controlled in accordance with operational information and a method and apparatus of fuzzy control which is based on the control rule generation method are designed to acquire measured information provided by measuring means equipped in the control object for measuring a state of the control object, acquire operational information of the operation which has been implemented for the control object at the time of acquisition of the measured information, and generate a control rule of operational information for measured information on the basis of the acquired measured information and operational information.

14 Claims, 7 Drawing Sheets

| SIGNAL NUMBER | SIGNAL NAME | NORMAL VALUE | VARIATION OF SIGNAL ▼ TIME POINT OF MANUAL OPERATION |
|---|---|---|---|
| 62 | CONTROL SIGNAL | 50% |  |
| 52 | FLOW RATE SIGNAL | 50ℓ/min |  |
| 54 | PRESSURE SIGNAL | 50Kpa |  |
| 56 | TEMPERATURE SIGNAL | 100°C |  |

F I G. 4

| NO | Y<br>AMOUNT OF CHANGE IN CONTROL VALUE 62<br>($\Delta$%) | $X_f$<br>DIFFERENCE OF FLOW RATE SIGNAL 52 FROM NORMAL VALUE<br>($\ell$/min) | $X_p$<br>DIFFERENCE OF PRESSURE SIGNAL 54 FROM NORMAL VALUE<br>(kpa) | $X_t$<br>DIFFERENCE OF TEMPERATURE SIGNAL 56 FROM NORMAL VALUE<br>(°C) | REMARKS |
|---|---|---|---|---|---|
| 1 | + 50 | + 7 | + 10 | + 22 | |
| 2 | - 10 | - 4 | - 7 | - 8 | |
| 3 | - 10 | - 5 | - 3 | - 10 | |
| 4 | + 30 | + 6 | - 4 | + 20 | |
| 5 | + 33 | + 5.6 | + 10 | + 17 | |
| 6 | - 20 | - 6 | + 3 | - 20 | |
| 7 | - 40 | - 6.2 | - 5 | - 25 | |
| 8 | - 20 | - 5 | - 6 | - 15 | |
| 9 | + 25 | + 5 | - 3 | + 17 | |
| 10 | + 28 | + 6.2 | + 13 | + 18 | |
| 11 | - 45 | - 6 | + 2 | - 25 | |
| 12 | + 5 | + 3 | + 3 | + 6 | |
| 13 | - 4 | - 3 | + 4 | - 5 | |
| 14 | + 30 | + 6.4 | - 6 | + 19 | |
| 15 | + 15 | + 5 | + 1 | + 13 | |

METHOD OF CONTROL RULE GENERATION AND METHOD OF FUZZY CONTROL USING THE SAME, AND APPARATUS FOR AUTOMATIC CONTROL RULE GENERATION AND FUZZY CONTROL APPARATUS USING THE SAME

BACKGROUND OF THE INVENTION

This invention relates to a method and apparatus for generating control rules used for expert systems and for fuzzy control, and to a method and apparatus for fuzzy control using the control rules. Particularly, the invention relates to a method and apparatus for automatic control rule generation which are suited to generate optimal control rules automatically without relying on the memory of a skilled operator who operates the control object.

The scheme of artificial intelligent (AI) control has been applied in many fields recently, and the range of application is further expanding. This control scheme formulates human experience into rules, and determines control values based on the rules. Conventionally, in creating a rule, the control system engineer collects the experience of operators on the operation of the control object and determines the rule based on feeling. However, the experience based on the memory of the operator is very ambiguous and it is necessary to collect much data thereby to remove inconsistent data in order to alleviate the ambiguity. The designer himself must know the control object to some extent for creating an optimal rule. If the designer relies on his feeling in generating a rule, it will take inpractically too long a time and the rule will lack the reliability due to the inclusion of inconsistent data or the like.

Various support systems have been proposed for rule generation as described, for example, in Japanese Patent Unexamined Publication Nos. 62-271146, 62-288941, 1-44546, 60-237539, and 63-27154. These conventional techniques of rule generation are designed to introduce graphics and simulation thereby to minimize the time expended in rule generation, or to generate a consistent rule automatically based on an existing rule.

SUMMARY OF THE INVENTION

A large plant is controlled in different manners at the time of start or halt, when the dynamic characteristics of the plant varies significantly, and at the time of steady-state operation. During the steady-state operation, in which the variation of the plant dynamic characteristics is small, it is easy to have the PID-based automatic control or the automatic control based on control rules that are created by the application of the above-mentioned prior art. A large plant is controlled separately for each storage vessel or piping and control rules must be created for all separate control objects by expending enormous time. This is a problem.

In controlling the start or halt of a plant, it is difficult to make a rule of control because of a significant variation of its dynamic characteristics, and the above-mentioned prior art cannot easily be applied, leaving the control to be relied on the manual operation of a skilled operator. Creation of control rules for the transition to the AI-based operation is entirely dependent on the experience of the operator, and how to form the experience into rules applicable to the practical situation is an imminent problem. Hearing of the operator's experience by the system designer to make control rules will result in the rule generation which depends on the feeling or proficiency of an individual system designer and also in the failure in collecting abundant data.

A first object of this invention is to provide a method and apparatus for automatic rule generation capable of automatically generating control rules, which is applicable to a large plant for its start or halt control in which the dynamic characteristics vary significantly, without relying on the operator's memory.

A second object of this invention is to provide a method and apparatus for fuzzy control in which the control object is controlled automatically and properly through the use of control rules that are generated automatically by the method and apparatus for accomplishing the first object of this invention.

The above first objective is achieved through the measurement of the actual values of states of the control object and the detection of the control values taken in the operation of the control object at the time of each state measurement, and the generation of control rule is based on the relation between the detected values.

The above first objective is also achieved through the measurement of multiple kinds of state values of the control object and the detection of control values for the control object taken in the control operation at the time of each state value measurement, with the measured state values and detected control values being memorized in a correspondent manner, the assessment of correlation between the measured state values and detected control values, and the calculation of regression lines or regression curves through the statistical process for the relation between the state values and control values with the degree of correlation greater than or equal to a prescribed value, and through the generation of control rules for the measured state values based on the regression line or regression curve.

The above second objective is achieved through the assessment of the reliability of control values for one kind of measured state value from a regression line or regression curve, the assessment of the reliability of control values for another kind of measured state value from another regression line or regression curve, and the operation of the control object using a control value which is based on a weighted average value of the reliabilities of the control values.

Since control rules are generated from measured state values and corresponding control values for the control object, the need of hearing the experience of operators is eliminated and the resulting control rules are immune to the subjective sense of the system designer.

Objective control rules, which do not depend on the designer, can be generated automatically in a short time without relying on the memory of a skilled operator.

Consequently, in implementing the fuzzy control based on the control rules, it becomes possible to simulate the actual operation taken by the operator, and automatic control for starting or halting a plant system, in which the dynamic characteristics vary significantly, is made possible.

DESCRIPTION OF THE PREFERRED EMBODIMENT

The following describes, with reference to the drawings, an embodiment of this invention which is applied to a plant.

Figure 1:
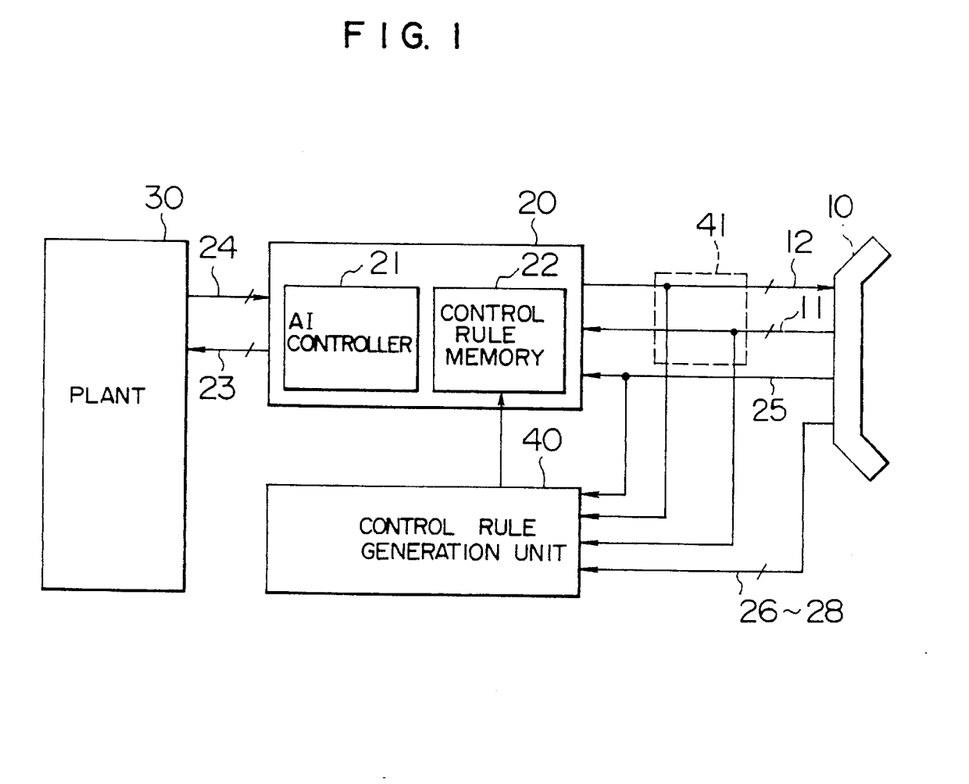
FIG. 1 is a block diagram of a plant control facility which is equipped with the automatic control rule generation apparatus based on an embodiment of this invention.

FIG. 1 is a block diagram of the plant control facility which is equipped with the automatic control rule generation apparatus based on the embodiment of this invention. The plant control facility includes a plant 30 as a control object, a plant control unit 20 which controls the plant, and a main control panel 10 on which the operator issues commands to the control unit 20.

The control unit 20 is a digital computer designed for control. The whole plant 30 may be controlled concentrically with a single control unit 20, or may be controlled distributively with a plurality of control units 20. Although the present invention is applicable to both cases, this embodiment is for a single control unit. The control unit 20 performs AI (artificial intelligence) control, sequence control, and PID (proportional plus integral plus derivative) control for operating the plant 30 stably, safely and automatically. The plant 30 may be controlled for starting or halting by the manual operation of the operator on the main control panel 10. In this case, the command signals 11 are entered to the control unit 20, which then responds to the command signals 11 to produce operation signals 23 to the plant 30 so that it is controlled. The plant 30 has the installation of various measuring devices, which send measured signals 24 to the control unit 20, which then produces corresponding detected signals 12 to the main control panel 10, on which the measured values are displayed on the respective instruments.

In this embodiment, during the manual operation by the operator, a control rule generation unit 40 introduces various data and generates a control rule, as will be explained in detail later. The generated control rule is added to control rules in the control rule memory 22 for the AI controller 21 provided in the control unit 20 or an older control rule is replaced with the created control rule. The addition or replacement of a control rule may be carried out automatically each time a new control rule is created, or, as in this embodiment, it may be implemented by the maintenance staff through the verification and decision on the addition or replacement of the rule in the memory 22 when the plant operation is halted.

Figure 2:
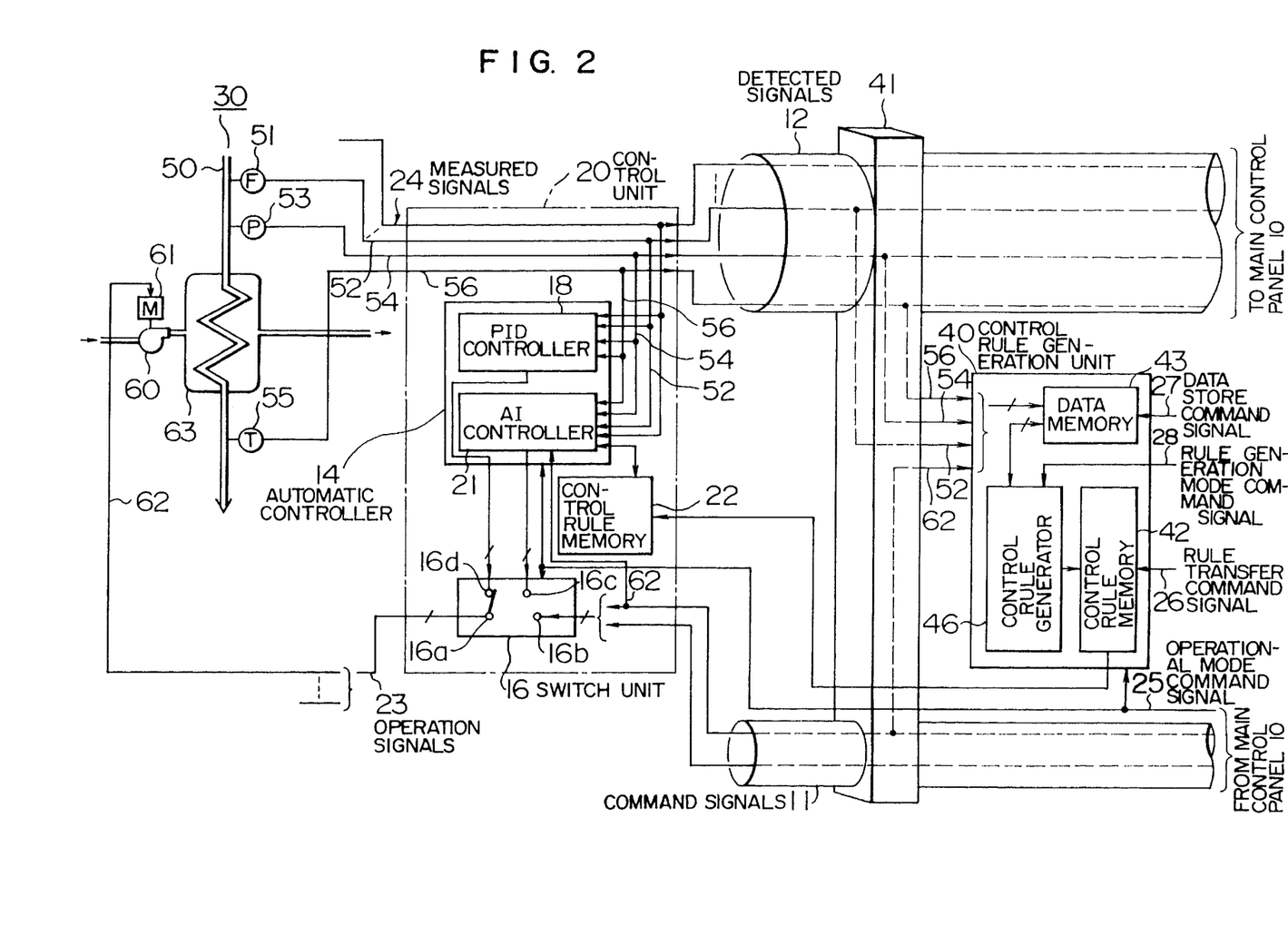
FIG. 2 is a schematic diagram showing the automatic control rule generation unit and plant control unit shown in FIG. 1.

The control rule generation unit 40 receives the detected signals 12 from the measuring devices and the associated manual command signals 11 via control rule generation terminal board 41 for the signal lines running between the main control panel 10 and the control unit 20. FIG. 2 is a diagram showing a specific arrangement of the automatic control rule generation unit 40 and control unit 20 in FIG. 1.

In FIG. 2, the control rule generation unit 40 comprises a data memory 43 which stores the detected signals 12, a control rule generator 46 which creates control rules in accordance with the data in the memory 43, and a control rule memory 42 which stores the created control rules.

The main control panel 10 is used to select manual operation or automatic control for the plant operation, and in the case of automatic control, it issues an operational mode command signals 25 indicative of the PID control or AI control to the units 20 and 40. The main control panel 10 further issues a data store command signal 27 indicative of the storing of the detected signals in the memory 43 to the memory 43 selectively, issues a rule generation mode command signal 28 indicative of automatic rule generation under the prescribed condition or rule generation based on the operator's will to the rule generator 46 selectively, and further issues a rule transfer command signal 26, indicative of the transfer of rules stored in the memory 42 to the control rule memory 22, to the memory 42. These signals 25–28 are produced by the operator arbitrarily. The transfer of the rules in the memory 42 to the memory 22 may be executed automatically upon starting the plant.

In the case of the manual operation mode, the memory 43 responds to the data store command signal 27 to store the detected signals 12 and the manual command signals 11. With the rule generation mode command signal 28 indicating the rule generation, the control rule generator 46 responds to the signal to generate a rule in accordance with the data in the memory 43, or with the command signal 28 indicating the automatic rule generation, it automatically generates a rule in accordance with the data in the memory 43 at the time when enough data to generate the rule have been stored in the memory 43 or on expiration of a prescribed time period since the previous rule generation, and it stores the created rule in the memory 42. The transfer of rules in the memory 42 to the memory 22 is carried out when the plant operation is halted or AI control is halted, preferably.

The control unit 20 comprises an automatic controller 14, a control rule memory 22 and a switch unit 16. The automatic controller 14 comprises a PID controller 18, an AI controller 21, etc., for example. In this embodiment, only the PID controller and AI controller are included for the sake of simplifying the explanation. The PID controller produces a PID control signal as an operation signal in accordance with the measured signals 24, and the AI controller produces an operation signal in accordance with the measured signals 24 and the control rules stored in the memory 22. The controllers 18 and 21 are activated in response to the operational mode command signal 24 indicative of the PID control and AI control, respectively. The switch unit 16 connects the output terminal 16 the input terminal 16b receiving the operation signal 11 when the operational mode signal 24 indicates the manual operation, connects the output terminal 16a to the input terminal 16c receiving the output of AI controller 21 when the mode signal indicates the AI control in the automatic operation mode, or connects the output terminal 16a to the input terminal 16d receiving the output of PID controller 18 when the mode signal indicates the PID control.

Next, the method of control rule generation by the control rule generation unit 40 will be explained.

In a plant, e.g., a chemical plant, state values such as the temperature, pressure and flow rate are measured for each vessel or piping, and control objects are controlled individually in response to the measured state values. This embodiment explained below, as an example, is a case where the present invention is applied to a cooler which is provided for controlling the temperature of liquid flowing in a process pipe 50. The cooler comprises a container 63 which covers part of the process pipe 50, a pump 60 which feeds liquid into the container 63 and a motor 61 which drives the pump 60 at a controlled rotational speed. The flow rate in the container 63 is controlled through the control of the motor 61, thereby controlling the temperature of the liquid flowing in the process pipe 50.

Even with the provision of such a cooler as a temperature control device, the dynamic characteristics of the plant vary significantly during the start and halt, and therefore the control scheme will become too intricate if attempted with the conventional PID control system. On this account, it is difficult for a large-scale chemical plant involving many similar control objects to organize an all-situation control system, and at present, automatic control is applied only to the steady-state operation, with the starting and halting operation being handled manually by the operator. When the overall automatic control is intended by employment of fuzzy control, a key factor is how to create control rules.

With the intention of maintaining the liquid temperature inside the process pipe 50, the operator sets manually on the main control panel 10 the rotational speed of the motor 61. In this case, the operator has to determine the motor speed for accomplishing the purpose while observing various instruments on the main control panel 10. However, it is not clear in what proportion the operator takes the reading of each instrument into account. Therefore, it is desirable to introduce as much instrument information as possible, so far as the computer can deal with it, to the automatic control rule generation unit 40 besides the information which is conceived to be indispensable for the determination of the motor speed. The reason is that the plant operator possibly uses several kinds of information unconsciously in determining the control value 62 of the motor 61.

The following explains the embodiment of the case in which the detected signals 52, 54 and 56 from the flow rate meter 51, pressure sensor 53 and temperature sensor 55 equipped in the process pipe 50 and the control value (operation signal 62) for the motor 61 determined by the operator are introduced to the control rule generation unit 40.

Figure 3:
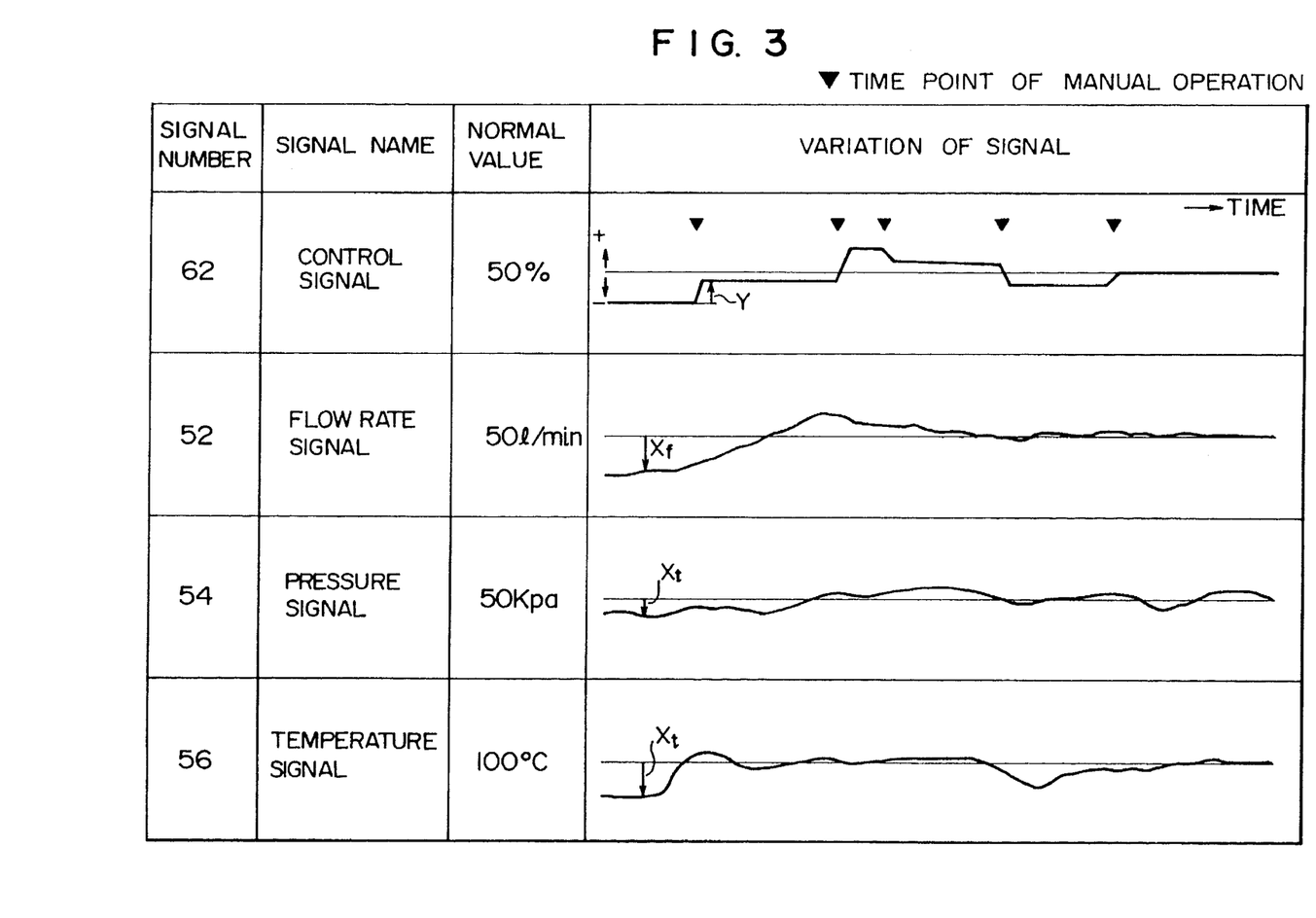
FIG. 3 is a diagram showing the relation between the amount of change in the control value and the measured flow rate, pressure and temperature.

It is assumed that the state values (flow rate, pressure and temperature) in the process pipe 50 measured by the measuring devices 51, 53 and 55 have relations on the time axis with the control signal 62 of the motor 61 as shown in FIG. 3.

Initially, a skilled operator manipulates the plant control in manual operation to store the values of the control signal (operation signal) 20 and values of the detected signals 52, 54 and 56 into the memory 43 of the control rule generation unit 40. The memory 43 stores a lot of data, and the control rule generator 46 analyzes the data to create a control rule, and stores the generated control rule in the rule memory 42.

Figure 5:
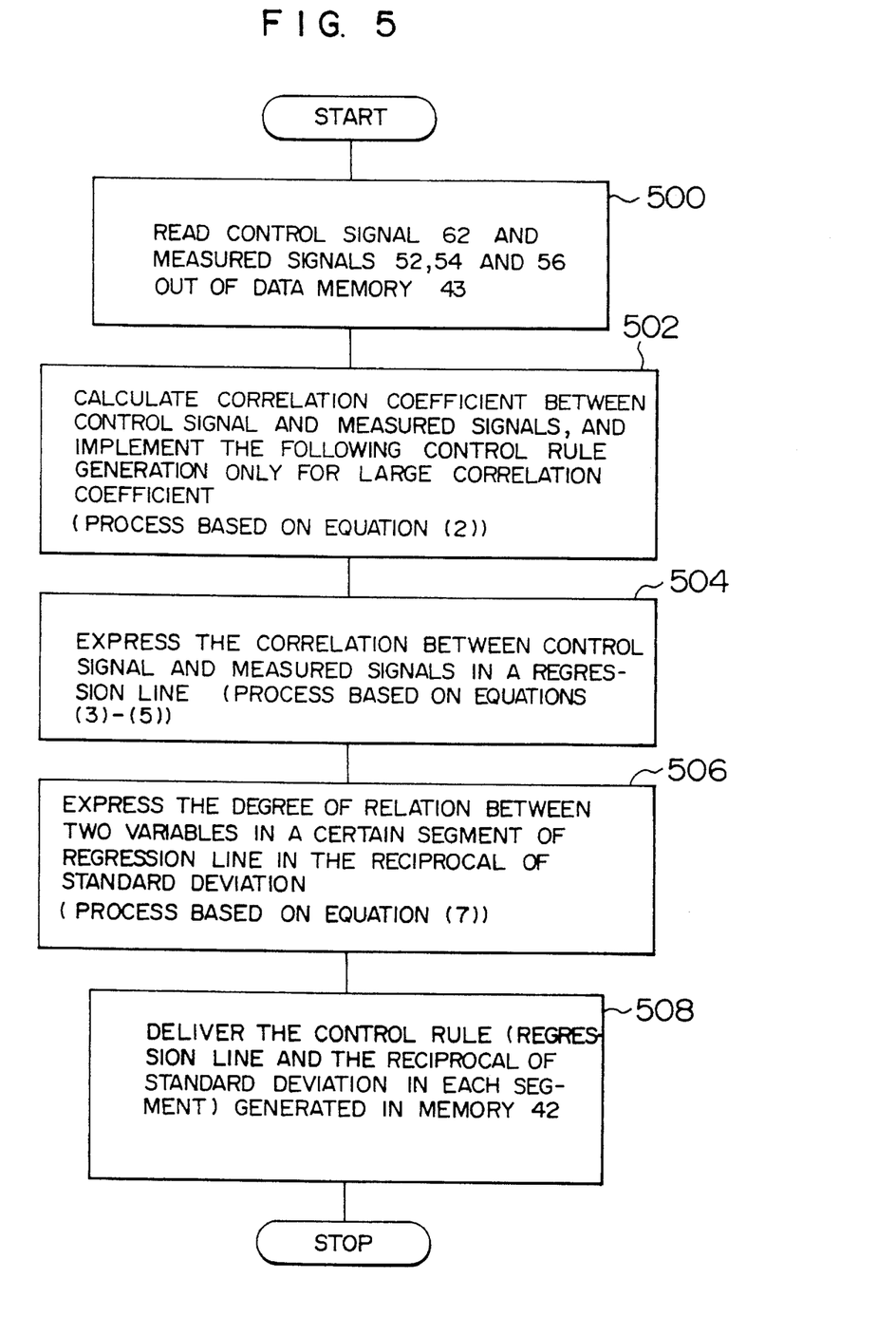
FIG. 5 is a flowchart showing the procedure of control rule generation.

The operation of control rule generation by the control rule generator 46 will be explained with reference to the flowchart of FIG. 5. In the first step 500 of control rule generation, stored data is read out of the memory 43. The readout data are measured values of the detected signals 52, 54 and 56 in correspondence to the value of the control signal 62 at the time of measurement. The memory 43 stores the value of the control signal 62 and detected signals 52, 54 and 56 at each time. The next step 502 evaluates the correlation coefficient between the measured value of the signal 52 and the value of control signal 62, between the measured value of signal 54 and the value of control signal 62, and between the measured value of signal 56 and the value of control signal 62, and verifies that the values of correlation coefficients are greater than or equal to the prescribed value.

Next, control rules are created only for the relations between measured values and control values with correlation coefficients being judged to be greater than or equal to the prescribed value in step 504. That is, in step 504, only measured values having correlation coefficients which were judged to be greater than or equal to the prescribed value in step 502 are selected, and control rules are created on the basis of the control values and only the selected measured values. This rule generation is to obtain a regression line (or regression curve) between measured values and control values.

Next, the regression line (or regression curve) is segmented, and the reciprocal of standard deviation of each segment is evaluated in order to know the strength of relation between the two variables (measured value and control value) (step 506). The last step 508 stores, as rules, the regression line (regression curve) and the reciprocal of standard deviation of each segment in the rule memory 42.

Figure 4:
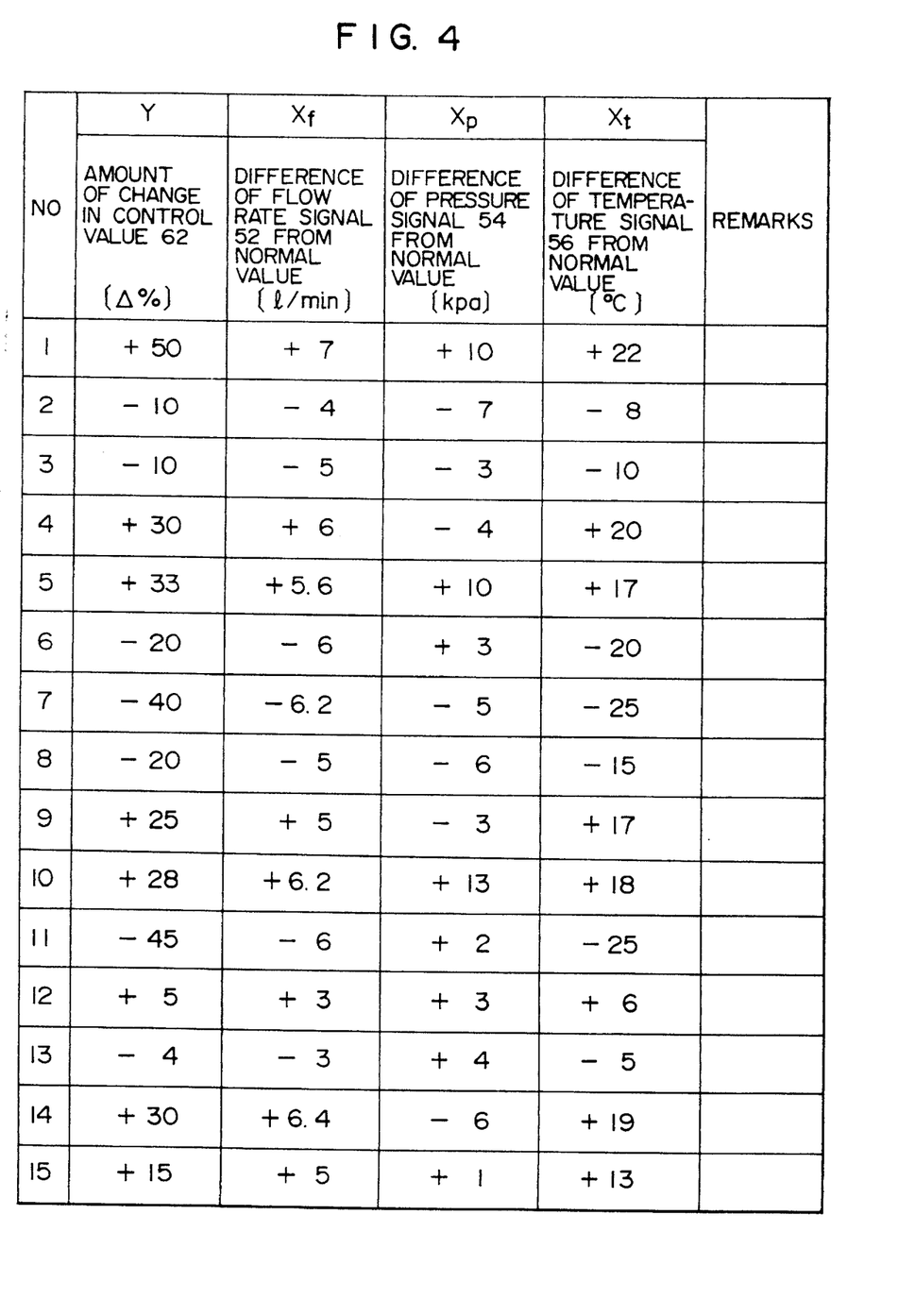
FIG. 4 is a diagram explaining the measured data.

This is the procedure of control rule generation based on this embodiment. The following explains the procedure of computation in more detail based on the assumption that deviations of the measured values of detected signals and a change rate (%) of the control value relative to a rated value thereof (hereinafter referred to a rate of change) introduced to the control rule generation unit 40 are as shown in FIG. 4.

The correlation coefficients are calculated based on the following equation from the amount (rate) of change Y in the value of control signal 62, the deviation Xf of the flow rate signal 52 from the normal value (50 l/min), the deviation of the pressure signal 54 from the normal value (50 kPa), and the deviation Xt of the temperature signal 56 from the normal value (100° C.).

$$r = \frac{\Sigma(X_n - \overline{X_n})(Y - \overline{Y})}{\sqrt{\Sigma(X_n - \overline{X_n})^2 \Sigma(Y - \overline{Y})^2}} \qquad (1)$$

$$= \frac{\Sigma x_n \cdot y}{\sqrt{\Sigma x_n^2 \Sigma y^2}}$$

where $\overline{X_n}$ is the mean value of $X_n$, $\overline{Y}$ is the mean value of Y, $x_n$ is equal to $X_n - \overline{X_n}$, and y is equal to $Y - \overline{Y}$. In the following equations, a measured value with a subscript of f for n represents the flow rate, that with a subscript of p for n represents the pressure, and that with a subscript of t for n represents the temperature.

The control rule generation based on this embodiment is carried out separately for the cases of the increasing and decreasing of the control value. The correlation coefficient between the two variables (measured value and control value) are expressed by the following variables.

rf+: The correlation coefficient between amount (rate) of variation Y of the control value and the derivation Xf of the flow rate signal 52 from the normal value in the case of increasing the value of the control signal 62.

rf−: The correlation coefficient between Y and Xf in the case of decreasing the value of the control signal 62.

rt+: The correlation coefficient between the amount (rate) of variation Y of the control value and the deviation Xp of the pressure signal 54 from the normal value in the case of increasing the value of the control signal 62.

rp−: The correlation coefficient between Y and Xp in the case of decreasing the value of the control signal 62.

rt+: The correlation coefficient between the amount (rate) of variation Y of the control value and the deviation Xt of the temperature signal 56 from the normal value in the case of increasing the value of the control signal 62.

rt−: The correlation coefficient between Y and Xt in the case of decreasing the value of the control signal 62.

For the data shown in FIG. 4, the correlation coefficient rf+ is calculated using the equation (1) as follows.

$\Sigma(Xf-\overline{Xf})(Y-\overline{Y})=102$ $\Sigma(Xf-\overline{Xf})^2=10.56$ $\Sigma(Y-\overline{Y})^2=1216$ Accordingly, $$rf+ = \frac{\Sigma(Xf-\overline{Xf})(Y-\overline{Y})}{\sqrt{\Sigma(Xf-\overline{Xf})^2\Sigma(Y-\overline{Y})^2}} \qquad (2)$$
$$= \frac{102}{\sqrt{10.56 \times 1216}}$$
$$= 0.90$$

Similarly, the remaining correlation coefficients are calculated as follows.

rf− = 0.815   rp+ = 0.30
rp− = 0.003   rt+ = 0.92
rt− = 0.95

This embodiment is designed to make control rules for detected signals with values of correlation coefficients greater than or equal to a prescribed value, e.g., 0.5. Correlation coefficients of 0.5 or above are rf+, rf−, rt+ and rt−. Accordingly, control rules are made for the relation between the change in the flow rate signal and the control value and the relation between the change in the temperature signal and the control value. No control rule is made for the pressure because of its small correlation with the control value. Since it is not known which kind of measured values are correlated with the control value, it is necessary to introduce as many kinds of measured information as possible. Among the introduced information, those with small correlations are removed.

The rule generation is summarized as follows.

Rule 1: If the flow rate signal 52 has increased beyond the normal value, the control value is increased.

Rule 2: If the flow rate signal 52 has decreased below the normal value, the control value is decreased.

Rule 3: If the temperature signal 56 has increased beyond the normal value, the control value is increased.

Rule 4: If the temperature signal 56 has decreased below the normal value, the control value is decreased.

Figure 6:
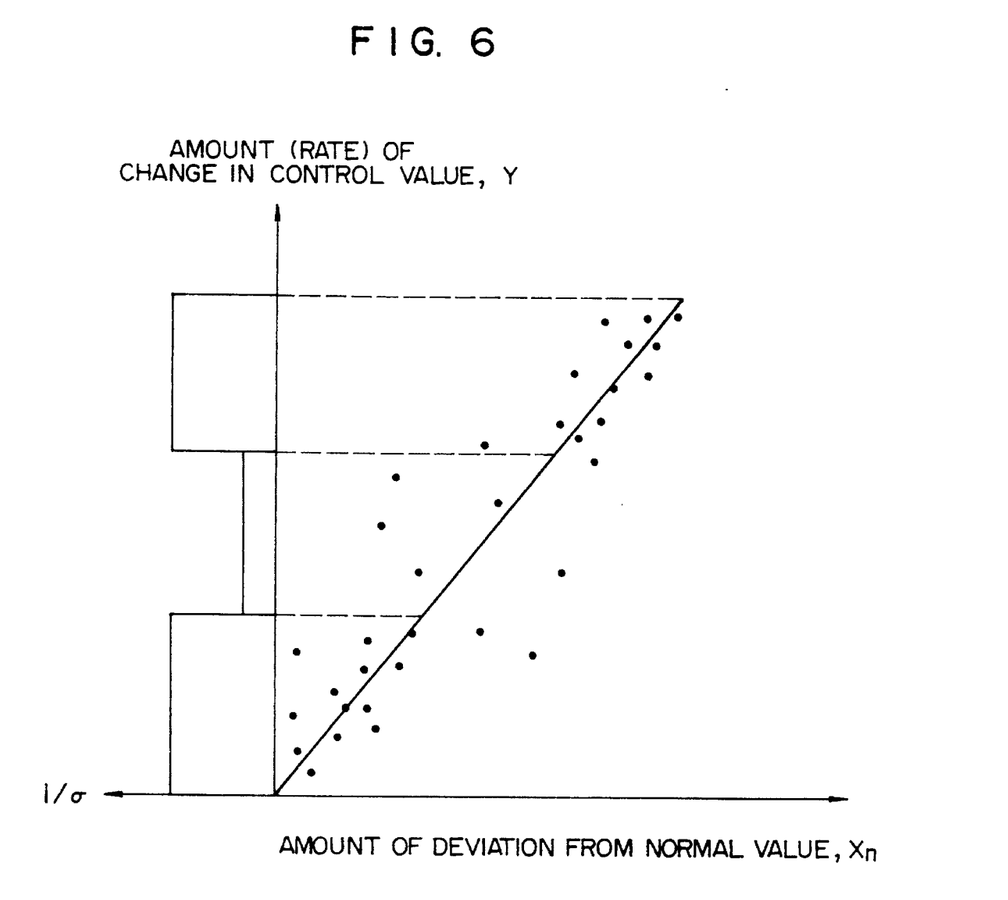
FIG. 6 is a graph showing a regression line between the measured value and the amount of change in the control value, and the reciprocal of standard deviation.

These rules, however, do not state the amount (rate) of change Y of the control value needed for the deviation Xn of a state value. The relation between the deviation Xn and the amount (rate) of change Y is plotted as shown in FIG. 6, for example. In this embodiment, the method of least squares or the like is used for calculating a regression line.

Next, the method of calculating a regression line $f(Xf)_1$ will be explained. The regression line $f(Xf)_1$ is calculated using the following equations (3), (4) and (5).

$$f(Xf)_1 = a_1 + b_1 Xf \qquad (3)$$

$$a_1 = \frac{\Sigma Xf \Sigma XfY - \Sigma Xf^2 \Sigma Y}{(\Sigma Xf)^2 - n\Sigma Xf^2} \qquad (4)$$

$$b_1 = \frac{n\Sigma XfY - \Sigma Xf \Sigma Y}{n\Sigma Xf^2 - (\Sigma Xf)^2} \qquad (5)$$

The regression line of rule 1 is calculated for the data of FIG. 4 as follows.

$\Sigma Xf = 44.2, \qquad \Sigma Y = 216,$ $\Sigma XfY = 1295.4, \qquad \Sigma Xf^2 = 254.76$ $$\therefore a_1 = \frac{44.2 \times 1295.4 - 254.76 \times 216}{(44.2)^2 - 8 \times 254.76} = -26.39$$

$$b_1 = \frac{8 \times 1295.4 - 44.2 \times 216}{8 \times 254.76 - (44.2)^2} = 9.66$$

$$\therefore f(Xf)_1 = -26.39 + 9.66Xf \qquad (6)$$

The equation (6) is determined from information based on the actual plant operation by the operator and data collected from the measuring devices installed in the plant, and the presence of correlation between the information and data is proved by the equation (2). However, not all points of Xf in the equation (6) have a high correlation as shown by the data in FIG. 6 for example. In this case, plots of data scatter from the regression line at intermediate portions of Xn and they have a small degree of correlation.

For the equation (6), the range of the variable is divided into a prescribed number of segments and the relation between the deviation Xf and the amount (rate) of change Y is evaluated for each segment. In this embodiment, the reciprocal of the standard deviation σ, i.e., 1/σ, is calculated as a degree of correlation in each segment.

In regard to the rule 1, the regression line $f(Xf)_1$ is divided into a plurality of, e.g., three, segments depending on the value of Y, i.e., segment I for Y=0 to 20%, segment II for Y=20 to 40%, and segment III for Y=40 to 60%, and the deviation from the equation (6) is calculated in terms of 1/σ for each segment. The value 1/σ is expressed by the following equation (7).

$$\frac{1}{\sigma} = \sqrt{\frac{N}{\Sigma(Y-f(x))^2}} \qquad (7)$$

The equation (7) gives values of the segments as follows.

Segment I: Y=0–20%

Plots of data (Xf, Y) in this segment are (3, 5) and (5, 15) with data numbers 12 and 15 according to FIG. 4, with N being equal to 2, and 1/σ is calculated as follows.

$$\frac{1}{\sigma} = \sqrt{\frac{2}{((5-2.59)^2 + (15-21.91)^2}} = 0.20$$

Segment II: Y=20–40%

Plots of data in this segment are (6, 30), (5.6, 33), (5, 25), (6.2, 28), and (6.4, 30), with data numbers 4, 5, 9, 10 and 14 (N=5) in FIG. 4, and 1/σ is calculated as follows.

1/σ=0.223

Segment III: Y=40–60%

The only plot of data in this segment is (7, 50) with data number 1 (N=1) in FIG. 4, and 1/σ is calculated as follows.

1/σ=0.114

The above computational procedure is applied to all rules and all segments for calculating the regression lines and 1/σ, resulting as follows.

Rule 1: $f(Xf)_1 = -26.39 + 9.66Xf \ldots$ \hfill (8-1)

1/σ(Y=0–20)=0.20 ... \hfill (8-2)

$1/\sigma(Y=20\text{--}40)=0.223\ldots$  (8-3)

$1/\sigma(Y=40\text{--}60)=0.114\ldots$  (8-4)

Rule 2: $f(Xf)_2=1.49+10.76Xf$  (9-1)

$1/\sigma(Y=0\text{---}20)=\ldots$  (9-2)

$1/\sigma(Y=-20\text{---}40)=\ldots$  (9-3)

$1/\sigma(Y=-40\text{---}60)=\ldots$  (9-4)

Rule 3: $f(Xt)_3=-12.92+2.42Xt$  (10-1)

$1/\sigma(Y=0\text{--}20)=0.34$  (10-2)

$1/\sigma(Y=20\text{--}40)=\ldots$  (10-3)

$1/\sigma(Y=40\text{--}60)=\ldots$  (-4)

Rule 4: $f(Xt)_4=6.88+1.83Xt$  (11-1)

$1/\sigma(Y=0\text{---}20)=\ldots$  (11-2)

$1/\sigma(Y=-20\text{---}40)=\ldots$  (11-3)

$1/\sigma(Y=-40\text{---}60)=\ldots$  (11-4)

In the above set of $1/\sigma$ values, those which are not referenced in the following explanation are replaced with symbol "..." for the clarity.

In the case of control rule generation according to this embodiment, the control rule generation unit 40 introduces the instrument data and control value data based on the manual operation automatically, and when a certain amount of data have been collected, the control rule generator 46 operates automatically or is activated by the operator thereby to calculate the $1/\sigma$ values. The generated control rules shown by 8-1 through 11-4 are stored in the memory 42. Accordingly, the operator can have intended control rules automatically at a certain interval or by merely dictating the rule generation when necessary. However, it does not mean that control rules as described above cannot be created unless the automatic control rule generation unit is available. What are needed for the rule generation are actual instrument data and associated control value data based on the manual operation, and therefore it is of course possible to generate control rules by the provision of a magnetic recording unit, for example, in the plant for collecting data and by analyzing the data afterward.

Although in the above embodiment, the relations between the control signal 62 and detected signals 52, 54 and 56 of the instruments is easily expressed in linear equations, allowing the assessment of their correlation in terms of correlation coefficients and the expression with regression lines, if their relations are hardly expressed linearly, it is recommended to use correlation indexes in place of correlation coefficients and use regression curves in place of regression lines. This alternative scheme is identical to the foregoing embodiment, with the only difference being the equations used in the control rule generation.

Although the above embodiment uses the reciprocal of standard deviation for the assessment of correlation between two variables at each point on a regression line (or regression curve), alternative parameters include the reciprocal of variance, 1-standard deviation, correlation coefficient, and correlation index. These mathematical schemes are generally known as well as the case of $1/\sigma$ adopted in this embodiment, and therefore examples of calculation of each of them are not shown here. Any of the schemes optimal to the characteristics of the control object should be chosen.

Next, fuzzy control which uses the control rules created as described above will be explained. The fuzzy controller of this embodiment is made operative by storing control rules in the control rule memory 22 of the AI controller 21 in the control unit 20 shown in FIG. 2. A method of fuzzy control by the AI controller for carrying out the automatic plant control will be explained with reference to the flowchart of FIG. 7.

Figure 7:
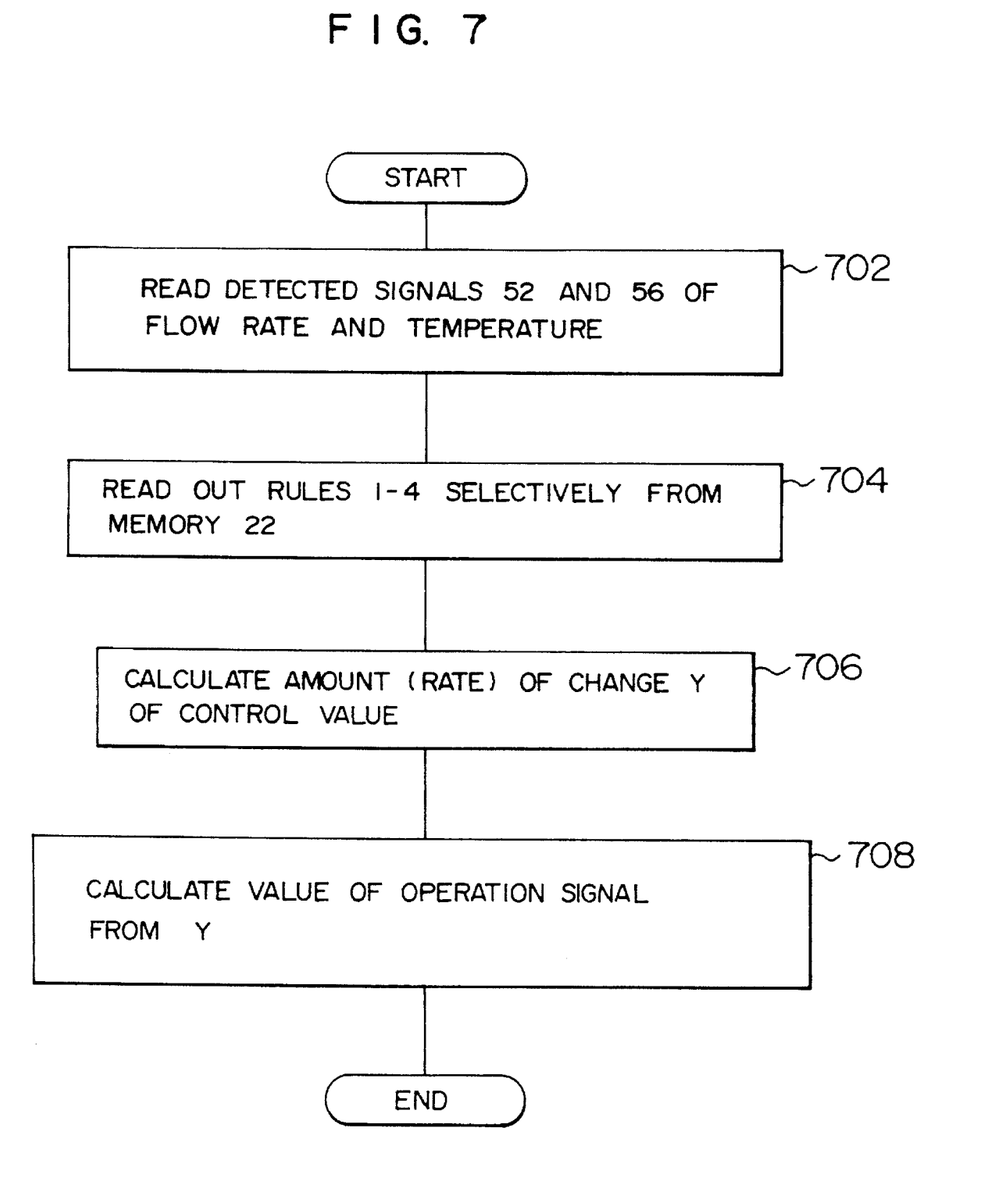
FIG. 7 is a flowchart explaining the AI control operation based on the control rules of operation implemented by the plant control unit.

The AI controller 21 is activated in response to the operational mode command signal 24 indicative of AI control, and it receives detected signals 52, 54 and 56 from the respective measuring devices 51, 53 and 55. The controller 21 calculates the deviations Xn of data from the respective normal values, and produces an operation or control signal 62 to the motor 61 by calculating the amount (rate) of change of control value for the motor 61 with respect to Xn. According to the above-mentioned control rules, the pressure of the liquid has a smaller correlation coefficient, and it is not taken into consideration in producing the control value signal. Accordingly, the AI controller 21 controls the motor speed based on the rules with correlation coefficients greater than or equal to the prescribed value stored in the memory 22, i.e., rules 8-1 through 11-4 for the flow rate and temperature.

Initially, step 702 reads the values of the detected flow rate and temperature signals 52 and 56. It is assumed that the detected signal 52 from the flow rate meter 51 has its value greater than the normal value by 3 l/min (Xf=3 l/min), and the detected signal 56 from the thermometer 55 has its value greater than the normal value by 15° C. (Xt=15° C.). The AI controller 21, which has read the introduced the signals 52 and 56, reads the rule 1 (equations 8-1 to 8-4) and rule 3 (equations 10-1 to 10-4) out of the four rules stored in memory 22 (step 704), and determines the amount (rate) of change Y of control value in step 706 as follows.

The rule 1 reveals the amount (rate) of change to be Y=2.59 for the case of Xf=3 l/min, with $1/\sigma$ being 0.2. The rule 3 reveals the amount (rate) of change to be Y=23.38 for the case of Xt=15° C., with $1/\sigma$ being 0.34. The amount (rate) of change of control value to be obtained finally is calculated by averaging the values resulting from the two rules by the application of weighting with the respective values of $1/\sigma$, as follows.

$$0.2\times2.59+0.34\times23.38/0.2+0.34=15.68\approx15.7$$

The AI controller multiplies the current value of the control signal 62 (control value) by 1.157 to produce a new control signal 62, and delivers it to the switch unit 16 (step 508). Consequently, by increasing the control signal 62 by 15.7%, the same control result as would be done by a skilled operator will be accomplished.

According to this embodiment, it becomes possible to generate control rules on the basis of the data which have been stored through the manual operation by the operator and thereafter operate on the AI controller to perform the automatic operation based on the generated control rules. Once a control rule set is generated, rules needed afterward can be created by modifying the existing control rules.

According to this embodiment, as described above, a plant operator needs not be engaged in the job of control rule generation for a long time, and moreover a lot of control rules can be generated automatically. The generated control rules are objective ones and the same rules are created regardless of operators by following the procedure based on this embodiment, whereby the plant operation is independent of the personal nature and the degree of proficiency of operators and the plant setup time can be reduced significantly. A significant reduction of time for the control rule generation in a large-scale plant is achieved, and it becomes possible to generate control rules of overall plant operation including the starting and halting phases in which the dynamic characteristics vary significantly.

Although in this embodiment operational information created by a skilled operator is introduced, the method and apparatus of control rule generation based on this embodiment can equally be applied to the case of control rule generation in which operational information collected through the automatic control operation is introduced. The present invention is not confined to industrial plants, but it is applicable to any kind of system which operates a control object in accordance with measured values of measuring devices equipped for the control object.

We claim:

1. A method of generating a control rule relating operational information for controlling a control object to at least one measured information, said method comprising the steps of:

acquiring a plurality of measured information respectively provided by a plurality of measuring means disposed in said control object for respectively measuring a plurality of states of said control object;

acquiring operational information of a control operation performed on said control object at a time of acquisition of said plurality of measured information;

calculating a degree of correlation between each of said plurality of measured information and said operational information;

judging whether said degree of correlation between each of said plurality of measured information and said operational information is not less than a prescribed value; and generating a control rule for controlling said control object on the basis of said operational information and only those measured information for which said degree of correlation is judged to be not less than said prescribed value.

2. A method of generating a control rule relating a control value for controlling a control object to at least one measured value, said method comprising the steps of:

acquiring a plurality of sets of measured values respectively provided by a plurality of measuring means disposed in said control object for respectively measuring a plurality of states of said control object;

acquiring a set of control values of a control operation performed on said control object at a time of acquisition of said plurality of sets of measured values;

calculating a degree of correlation between each of said plurality of sets of measured values and said set of control values;

judging whether said degree of correlation between each of said plurality of sets of measured values and said set of control values is not less than a prescribed value; and generating a control rule for controlling said control object on the basis of said set of control values and only those sets of measured values for which said degree of correlation is judged to be not less than said prescribed value.

3. A method according to claim 2, wherein said step of generating a control rule includes the steps of:

deriving a regression line or a regression curve for each set of measured values for which said degree of correlation is judged to be not less than said prescribed value representing a relation between said set of control values and said each set of measured values; and generating a control rule for said control object on the basis of said regression line or said regression curve derived for said each set of measured values.

4. A method of generating a control rule relating a control value for controlling a control object to at least one measured value, said method comprising the steps of:

acquiring a plurality of sets of measured values respectively provided by a plurality of measuring means disposed in said control object for respectively measuring a plurality of states of said control object;

acquiring a set of control values of a control operation performed on said control object at a time of acquisition of said plurality of sets of measured values;

calculating respective deviations of said measured values in each of said plurality of sets of measured values from a respective normal measured value;

calculating respective amounts of change of said control values in said set of control values relative to respective previous ones of said control values in said set of control values;

calculating a correlation coefficient for each of said plurality of sets of measured values on the basis of said respective deviations of said measured values in each of said plurality of sets of measured values and said respective amounts of change of said control values in said set of control values;

judging whether said correlation coefficient for each of said plurality of sets of measured values is not less than a prescribed value; and generating a control rule for controlling said control object on the basis of said set of control values and only those sets of measured values for which said correlation coefficient is judged to be not less than said prescribed value.

5. An apparatus for generating a control rule relating operational information for controlling a control object to measured information, said apparatus comprising:

means for acquiring a plurality of measured information respectively provided by a plurality of measuring means disposed in said control object for respectively measuring a plurality of states of said control object;

means for acquiring operational information of a control operation performed on said control object at a time of acquisition of said plurality of measured information;

means for calculating a degree of correlation between each of said plurality of measured information and said operational information;

means for judging whether said degree of correlation between each of said plurality of measured information and said operational information is not less than a prescribed value; and means for generating a control rule for controlling said control object on the basis of said operational information and only those measured information for which said degree of correlation is judged to be not less than said prescribed value.

6. An apparatus for generating a control rule relating a control value for controlling a control object to at least one measured value, said apparatus comprising:

means for acquiring a plurality of sets of measured values respectively provided by a plurality of measuring means disposed in said control object for respectively measuring a plurality of states of said control object;

means for acquiring a set of control values of a control operation performed on said control object at a time of acquisition of said plurality of sets of measured values;

means for calculating a degree of correlation between each of said plurality of sets of measured values and said set of control values;

means for judging whether said degree of correlation between each of said plurality of sets of measured values and said set of control values is not less than a prescribed value; and means for generating a control rule for controlling said control object on the basis of said set of control values and only those sets of measured values for which said degree of correlation is judged to be not less than said prescribed value.

7. An apparatus according to claim 6, wherein said means for generating a control rule includes:

means for performing a statistical process on each set of measured values for which said degree of correlation is judged to be not less than said prescribed value and said set of control values to derive an equation for said each set of measured values representing a relation between said each set of measured values and said set of control values; and means for generating a control rule for said control object on the basis of said equation derived for said each set of measured values.

8. An apparatus according to claim 6, wherein said means for generating a control rule includes:

means for performing a statistical process on each set of measured values for which said degree of correlation is judged to be not less than said prescribed value and said set of control values to derive a regression line or a regression curve representing a relation between said set of control values and said each set of measured values; and means for generating a control rule for said control object on the basis of said regression line or said regression curve derived for said each set of measured values.

9. An apparatus according to claim 6, wherein said means for calculating a degree of correlation includes:

means for calculating respective deviations of said measured values in each of said plurality of sets of measured values from a respective normal measured value;

means for calculating respective amounts of change of said control values in said set of control values relative to respective previous ones of said control values in said set of control values; and means for calculating a correlation coefficient for each of said plurality of sets of measured values on the basis of said respective deviations of said measured values in each of said plurality of sets of measured values and said respective amounts of change of said control values in said set of control values;

wherein said means for judging judges whether said degree of correlation between each of said plurality of sets of measured values and said set of control values is not less than a prescribed value by judging whether said correlation coefficient for each of said plurality of sets of measured values is not less than a prescribed value.

10. A method of generating a control rule relating a control value for controlling a control object to at least one measured value, said method comprising the steps of:

acquiring a plurality of sets of measured values respectively provided by a plurality of measuring means disposed in said control object for respectively measuring a plurality of states of said control object;

acquiring a set of control values of a control operation performed on said control object at a time of acquisition of said plurality of measured values;

calculating a degree of correlation between each of said plurality of sets of measured values and said set of control values;

judging whether said degree of correlation between each of said plurality of sets of measured values and said set of control values is not less than a prescribed value;

deriving a regression line or a regression curve for each set of measured values for which said degree of correlation is judged to be not less than said prescribed value representing a relation between said set of control values and said each set of measured values; and generating a control rule for said control object on the basis of said regression line or said regression curve derived for said each set of measured values.

11. A fuzzy control method for controlling a control object in accordance with a first control rule relating a first control value to a first measured value and a second control rule relating a second control value to a second measured value, the first control rule and the second control rule being generated by a method of generating a control rule relating a control value for controlling a control object to at least one measured value, said method of generating a control rule including the steps of acquiring a plurality of sets of measured values respectively provided by a plurality of measuring means disposed in said control object for respectively measuring a plurality of states of said control object, acquiring a set of control values of a control operation performed on said control object at a time of acquisition of said plurality of measured values, calculating a degree of correlation between each of said plurality of sets of measured values and said set of control values, judging whether said degree of correlation between each of said plurality of sets of measured values and said set of control values is not less than a prescribed value, deriving a regression line or a regression curve for each set of measured values for which said degree of correlation is judged to be not less than said prescribed value representing a relation between said set of control values; and said each set of measured values, and generating a control rule for said control object on the basis of said regression line or said regression curve derived for said each set of measured values, said fuzzy control method comprising the steps of:

determining a first reliability of the first control value on the basis of the regression line or the regression curve on the basis of which the first control rule was generated;

determining a second reliability of the second control value on the basis of the regression line or the regression curve on the basis of which the second control rule was generated;

generating a third control value by averaging the first control value weighted by the first reliability and the second control value weighted by the second reliability; and operating said control object on the basis of the third control value.

12. An apparatus for generating a control rule relating a control value for controlling a control object to at least one measured value, said apparatus comprising:

means for acquiring a plurality of sets of measured values respectively provided by a plurality of measuring means disposed in said control object for respectively measuring a plurality of states of said control object;

means for acquiring a set of control values of a control operation performed on said control object at a time of acquisition of said plurality of sets of measured values;

means for calculating a degree of correlation between each of said plurality of sets of measured values and said set of control values;

means for judging whether said degree of correlation between each of said plurality of sets of measured values and said set of control values is not less than a prescribed value;

means for performing a statistical process on each set of measured values for which said degree of correlation is judged to be not less than said prescribed value and said set of control values to derive a regression line or a regression curve representing a relation between said set of control values and said each set of measured values; and means for generating a control rule for said control object on the basis of said regression line or said regression derived for said each set of measured values.

13. A fuzzy control apparatus for controlling a control object in accordance with a first control rule relating a first control value to a first measured value and a second control rule relating a second control value to a second measured value, the first control rule and the second control rule being generated by an apparatus for generating a control rule relating a control value for controlling a control object to at least one measured value, said apparatus for generating a control rule including means for acquiring a plurality of sets of measured values respectively provided by a plurality of measuring means disposed in said control object for respectively measuring a plurality of states of said control object, means for acquiring a set of control values of a control operation performed on said control object at a time of acquisition of said plurality of sets of measured values, means for calculating a degree of correlation between each of said plurality of sets of measured values and said set of control values, means for judging whether said degree of correlation between each of said plurality of sets of measured values and said set of control values is not less than a prescribed value, means for performing a statistical process on each set of measured values for which said degree of correlation is judged to be not less than said prescribed value and said set of control values to derive a regression line or a regression curve representing a relation between said set of control values and said each set of measured values, and means for generating a control rule for said control object on the basis of said regression line or said regression derived for said each set of measured values, said fuzzy control apparatus comprising:

means for determining a first reliability of the first control value on the basis of the regression line or the regression curve on the basis of which the first control rule was generated, and determining a second reliability of the second control value on the basis of the regression line or the regression curve on the basis of which the second control rule was generated; and means for generating a third control value by averaging the first control value weighted by the first reliability and the second control value weighted by the second reliability, and for operating said control object on the basis of the third control value.

14. A method of fuzzy control for controlling a control object on the basis of a control rule relating operational information for controlling said control object to at least one measured information, said method comprising the steps of:

acquiring a plurality of measured information respectively provided by a plurality of measuring means disposed in said control object for respectively measuring a plurality of states of said control object;

acquiring operational information of a control operation performed on said control object at a time of acquisition of said plurality of measured information;

calculating a degree of correlation between each of said plurality of measured information and said operational information;

judging whether said degree of correlation between each of said plurality of measured information and said operational information is not less than a prescribed value;

generating a control rule for controlling said object on the basis of said operational information and only those measured information for which said degree of correlation is judged to be not less than said prescribed value; and.

obtaining operational information for controlling said control object from measured information provided by any measuring means which provided said measured information for which said degree of correlation is not less than said prescribed value on the basis of said control rule.

* * * * *